US007638079B2

(12) United States Patent
Peng et al.

(10) Patent No.: US 7,638,079 B2
(45) Date of Patent: Dec. 29, 2009

(54) THIN WALL GLOVE WITH THICKER CUFF

(75) Inventors: Shuo Peng, Reno, NV (US); Jian Tao, Reno, NV (US)

(73) Assignee: Microflex Corporation, Reno, NV (US)

( * ) Notice: Subject to any disclaimer, the term of this patent is extended or adjusted under 35 U.S.C. 154(b) by 244 days.

(21) Appl. No.: 11/287,372

(22) Filed: Nov. 28, 2005

(65) Prior Publication Data

US 2007/0120294 A1    May 31, 2007

(51) Int. Cl.
*B28B 7/22* (2006.01)
*B28B 1/38* (2006.01)
*A41D 19/00* (2006.01)
*B65D 39/00* (2006.01)

(52) U.S. Cl. .................. 264/255; 264/254; 264/294; 264/303; 264/305; 264/306; 264/307; 264/308; 427/2.3; 428/36.8

(58) Field of Classification Search ............... None
See application file for complete search history.

(56) References Cited

U.S. PATENT DOCUMENTS

| | | | |
|---|---|---|---|
| 2,526,431 A | * | 10/1950 | Strickhouser .............. 427/302 |
| 3,397,265 A | | 8/1968 | Ansell |
| 3,689,613 A | | 9/1972 | Talalay |
| 3,843,196 A | | 10/1974 | Sidley |
| 3,852,826 A | * | 12/1974 | Schindler ................... 2/168 |
| 3,859,410 A | | 1/1975 | Sidley |
| 5,833,911 A | * | 11/1998 | Llort et al. ................ 264/301 |
| 5,881,387 A | | 3/1999 | Merovitz et al. |
| 2005/0115568 A1 | | 6/2005 | Martin |

* cited by examiner

*Primary Examiner*—Monica A Huson
*Assistant Examiner*—Jeffrey Wollschlager
(74) *Attorney, Agent, or Firm*—Evan M. Kent; Stewart L. Gitler

(57) ABSTRACT

Extra coagulant is added to the cuff portion of the former by a spray nozzle located between the coagulant and latex dipping tanks. A former is placed into a coagulant. After removal from the coagulant, additional coagulant to the cuff portion of the former by any conventional means, such as a spray nozzle. The higher concentration of coagulant at the cuff portion results in a thicker latex thickness at the cuff portion and counteracts the reduced dwell time of the cuff in the latex dipping tank as compared to the fingertip portion of the former. The thickness of the cuff portion can be controlled by altering the concentration of the coagulant applied by the spray nozzle.

10 Claims, 1 Drawing Sheet

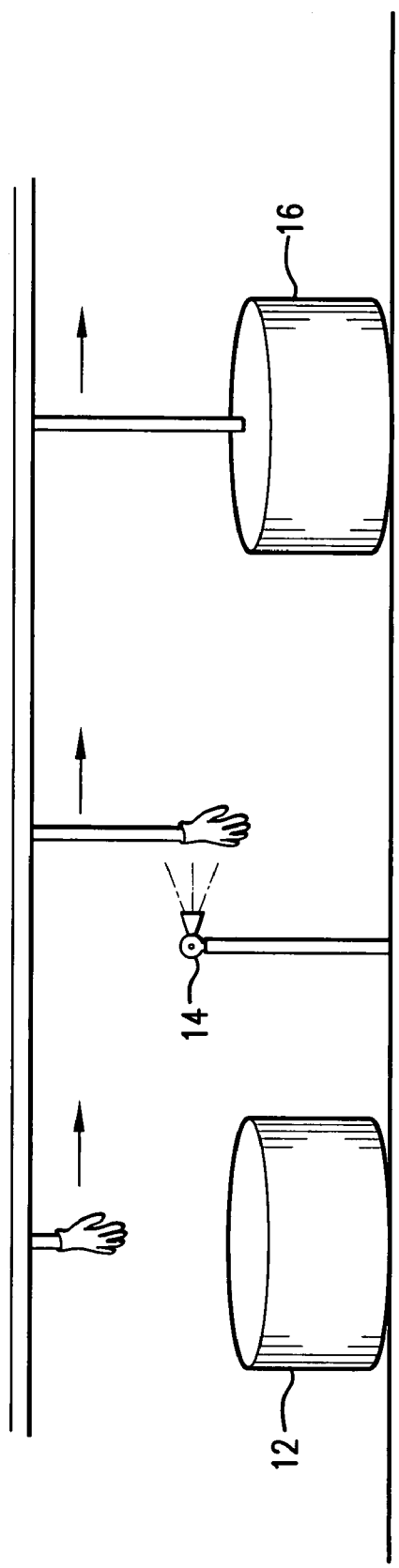

THIN WALL GLOVE WITH THICKER CUFF

BACKGROUND OF THE INVENTION

Unsupported thin wall gloves are made via a dipping procedure from materials including natural rubber latex, polychloroprene, polyisoprene, carboxylated acrylonitrile butadiene, styrene butadiene copolymer, polyurethane and blends of these materials. The material is an aqueous emulsion form with natural rubber latex being concentrated and preserved prior to use and synthetic rubber materials polymerized via emulsion polymerization.

In the dipping procedure, a hand shaped former is lowered into the compound causing a thin layer of the compound to deposit on to the former. After vulcanization, the gloves are removed from the former. In addition to gloves, condoms and balloons are also formed in this manner.

The former is lowered into the compound with the fingertips entering the tank first and coming out last. The fingertip portion of the former, therefore, has a greater time in the compound known as dwell time. The greater dwell time results in a thicker layer of compound at the fingertips and thinnest at the cuff. This thickness is designed as the thinner cuffs are more prone to tearing when the gloves are donned and thicker fingertips are a hindrance when the wearer performs intricate tasks. Tests on 30 products from difference manufacturers found a thickness gradient of 0.1 mm at the palm and 0.18 mm at the fingertips.

In addition to dwell time, other factors impact the thickness of material deposited on the former. To insure uniform deposition, a coagulant, such as calcium nitrate solution with appropriate additives such as ionic and non-ionic surfactants, mold releasing agents and other conventional additives are employed in the compound. The higher concentration of coagulant the thicker the film formed on the former. In addition, a latex compound having a higher solid content results in a thicker film. To a lesser extent, the temperature of the former affects thickness as a lower temperature tends to result in a thicker glove. Regardless of these factors, the introduction of the former fingertip first into the compound always results in the finger tip having a greater dwell time than the cuff and is a factor weighing in favor fingertips having a greater thickness than the cuffs.

Attempts to address this problem are found in previous patents. U.S. Pat. No. 3,397,265 describes a multiple dipping process including dipping the full length of a former into a concentrated coagulant, dipping the former having the coagulant into water below the wrist to remove the coagulant from the palm and fingers, dipping the former into diluted coagulant to have a varying concentration of coagulant along the former and then dipping the full length of the former into a latex compound.

Practical difficulties with this method is the contamination of the water tank with coagulant that is removed from the former. The concentration of the coagulant within the water tank increases with each successive former introduced into the tank. Also, a large amount of coagulant is wasted by removal by the water.

U.S. Pat. Nos. 3,859,410 and 3,843,196, both to Sidley, disclose a multiple dipping process including dipping a former into a concentrated coagulant with cuff portion first followed by dipping the former into a diluted coagulant fingertips first to a level below the wrist to achieve a varying concentration of coagulant followed by dipping the former, fingertips first, into a latex compound tank. This requires a specially designed machine in order to invert the former. Also, the holder of the former is immersed into the coagulant tank leading to an inevitable contamination.

It is an object of the invention to provide a dwell having a more uniform thickness between cuff and fingertip.

It is another object of the invention to provide a glove having additional coagulant at the cuff to result in a thicker cuff.

It is another object of the invention to provide a method for making the glove having a varying amount of coagulant along the former.

It is another object of the invention to provide a method for having a thicker cuff made by a method without contamination of the separate tanks used in the method.

These and other objects of the invention will become apparent to one of ordinary skill in the art after reading the disclosure of the invention.

SUMMARY OF THE INVENTION

Extra coagulant is added to the cuff portion of the former by a spray nozzle located between the coagulant and latex dipping tanks. A former is placed into a coagulant. After removal from the coagulant, additional coagulant to the cuff portion of the former by any conventional means, such as a spray nozzle. The higher concentration of coagulant at the cuff portion results in a thicker latex thickness at the cuff portion and counteracts the reduced dwell time of the cuff in the latex dipping tank as compared to the fingertip portion of the former. The thickness of the cuff portion can be controlled by altering the concentration of the coagulant applied by the spray nozzle.

BRIEF DESCRIPTION OF THE DRAWINGS

FIG. 1 shows the assembly line views in the method of the invention.

DETAILED DESCRIPTION OF THE INVENTION

The method for forming the glove is displayed with reference to FIG. 1. In a conventional glove forming process, the form is dipped into a first tank containing coagulant and a second tank containing the rubber compound. The glove is then vulcanized and removed from the former. In the instant method, a former is placed within a first tank 12 to place coagulant on the full length of the former. The former is removed from the first tank 12 and is moved along the assembly line towards the second tank 16 containing latex compound. Between the first tank 12 and second tank 16 is an applicator, such as spray nozzle 14. The spray nozzle 14 applies additional coagulant to the cuff portion of the former before the insertion of the former into the latex compound. The greater concentration of coagulant at the cuff portion is a fact causing an increased thickness of the cuff. This greater concentration of coagulant counteracts the greater dwell time of the fingertips, normally causing the fingertips to have a greater thickness than the cuff.

The resulting thickness of gloves formed by an addition of a spray nozzle between the coagulant and latex dipping tanks for various materials is summarized in the table below:

TABLE I

| Gloves | Thickness (mm) | | |
|---|---|---|---|
| | Cuff | Palm | Fingertip |
| Regular latex | 0.11 | 0.16 | 0.21 |
| This invention | 0.15 | 0.14 | 0.18 |
| Regular nitrile | 0.11 | 0.14 | 0.19 |
| This invention | 0.14 | 0.13 | 0.18 |
| Regular nitrile and polychloroprene blend | 0.10 | 0.12 | 0.17 |
| This invention | 0.13 | 0.12 | 0.17 |

As can be seen by the above table, the cuff thickness has been greatly improved relative to the fingertip thickness to result in a more uniform article. As mentioned previously, thick fingertips are undesired as a waste material, increased costs and are clumsy for intricate tasks. However, it was not possible in the past to reduce the fingertip thickness without resulting in a cuff thickness rendering the glove useless. With the ability to increase the thickness of the cuff by the use of the spray nozzle, it is possible to decrease the thickness of the fingertip while still maintaining a cuff thickness allowing donning of the glove without tearing. Table No. 2, below, summarizes use of a spray nozzle to achieve a cuff having a thickness similar to prior art, but having thinner fingertip portions.

TABLE II

| Gloves | Thickness (mm) | | |
|---|---|---|---|
| | Cuff | Palm | Fingertip |
| Regular latex | 0.11 | 0.16 | 0.21 |
| This invention | 0.11 | 0.10 | 0.13 |
| Regular nitrile | 0.11 | 0.14 | 0.19 |
| This invention | 0.10 | 0.10 | 0.14 |
| Regular nitrile and polychloroprene blend | 0.10 | 0.12 | 0.17 |
| This invention | 0.10 | 0.10 | 0.13 |

The invention may use lower concentrations of coagulant and lower solid content for the latex compound. Alternatively, the same coagulant concentration and latex compound solid content may be used but the dwell duration of the former in the dipping tank can be reduced to result in a thinner film. The overall more uniform thickness results in easier temperature control and organization to ensure even curing of the latex. In the past, vulcanization would result in overcured cuffs with undercured fingertips.

The more uniform thickness of the glove provides satisfactory hand protection but are more comfortable due to the thinner fingertip thickness. Also, the thinner fingertip thickness with uniform cuff thickness reduces the amount of material per glove.

While the invention has been described with reference to a preferred embodiment, variations and modifications will be apparent to one of ordinary skill in the art. The invention encompasses such variations and modifications without departing from the scope of the invention.

We claim:

1. A method of forming articles, comprising
   applying a first coat of coagulant over a full length of a former between a first lower end and an upper end,
   applying a second coat of coagulant proximate said upper end said second coat extending less than said full length of said former, and
   applying rubber material to said former.
2. The method of claim 1, wherein the second coat is applied to the upper end by spraying.
3. The method of claim 1, wherein said rubber material is nitrile rubber.
4. The method of claim 1, wherein said rubber material is latex rubber.
5. The method of claim 1, wherein said former forms gloves and the upper end is a cuff portion.
6. The method of claim 1, wherein said first coat is applied by dipping.
7. A method of forming articles, comprising
   applying a first coat of coagulant to a former having a lower first end and an upper end,
   applying a second coat of coagulant proximate said upper end said second coat extending less than said full length of said former, and
   applying rubber material to said former, wherein the method further comprises applying said first coat to the full length of the former.
8. The method of claim 7, wherein said first coat is applied by dipping.
9. The method of claim 7, wherein said first coat is applied by spraying.
10. The method of claim 7, wherein the articles are gloves and the upper end is a cuff portion.

* * * * *